United States Patent [19]

Narukawa et al.

[11] Patent Number: 5,556,722
[45] Date of Patent: Sep. 17, 1996

[54] TIGHTLY SEALED PRISMATIC BATTERY

[75] Inventors: Satoshi Narukawa, Sumoto; Toru Amazutsumi, Tsuna-gun; Hiyoshi Tamaki; Yasuhiro Yamauchi, both of Sumoto, all of Japan

[73] Assignee: Sanyo Electric Co., Ltd., Osaka, Japan

[21] Appl. No.: 442,826

[22] Filed: May 17, 1995

[30] Foreign Application Priority Data

May 31, 1994 [JP] Japan ..................................... 6-118690

[51] Int. Cl.$^6$ ..................................... H01M 2/02
[52] U.S. Cl. ........................... 429/163; 429/94; 429/164; 429/176
[58] Field of Search .................................. 429/163, 164, 429/176, 94

[56] References Cited

U.S. PATENT DOCUMENTS

| | | | |
|---|---|---|---|
| 3,530,001 | 9/1970 | Harivel | 429/94 |
| 4,964,877 | 10/1990 | Keister et al. | 29/623.1 |
| 5,051,322 | 9/1991 | Hasenauer | 429/120 |
| 5,209,991 | 5/1993 | Stocchiero | 426/66 |
| 5,344,724 | 9/1994 | Ozaki et al. | 429/94 |
| 5,439,760 | 8/1995 | Howard et al. | 429/94 |

*Primary Examiner*—Stephen Kalafut
*Assistant Examiner*—Richard H. Lilley, Jr.
*Attorney, Agent, or Firm*—Wenderoth, Lind & Ponack

[57] ABSTRACT

Corner region vacancies resulting from insertion of a spiral electrode unit into a prismatic can are fully utilized to reinforce the can and produce superior battery characteristics. A non-circular spiral electrode unit is made by rolling a negative electrode-separator-positive electrode sandwich. A prismatic shaped can has corners which are thicker than the straight-line regions of the can. The can houses the the electrode unit In a tightly sealed fashion with the outer winding of the electrode unit mechanically held in electrical contact with the can.

7 Claims, 4 Drawing Sheets

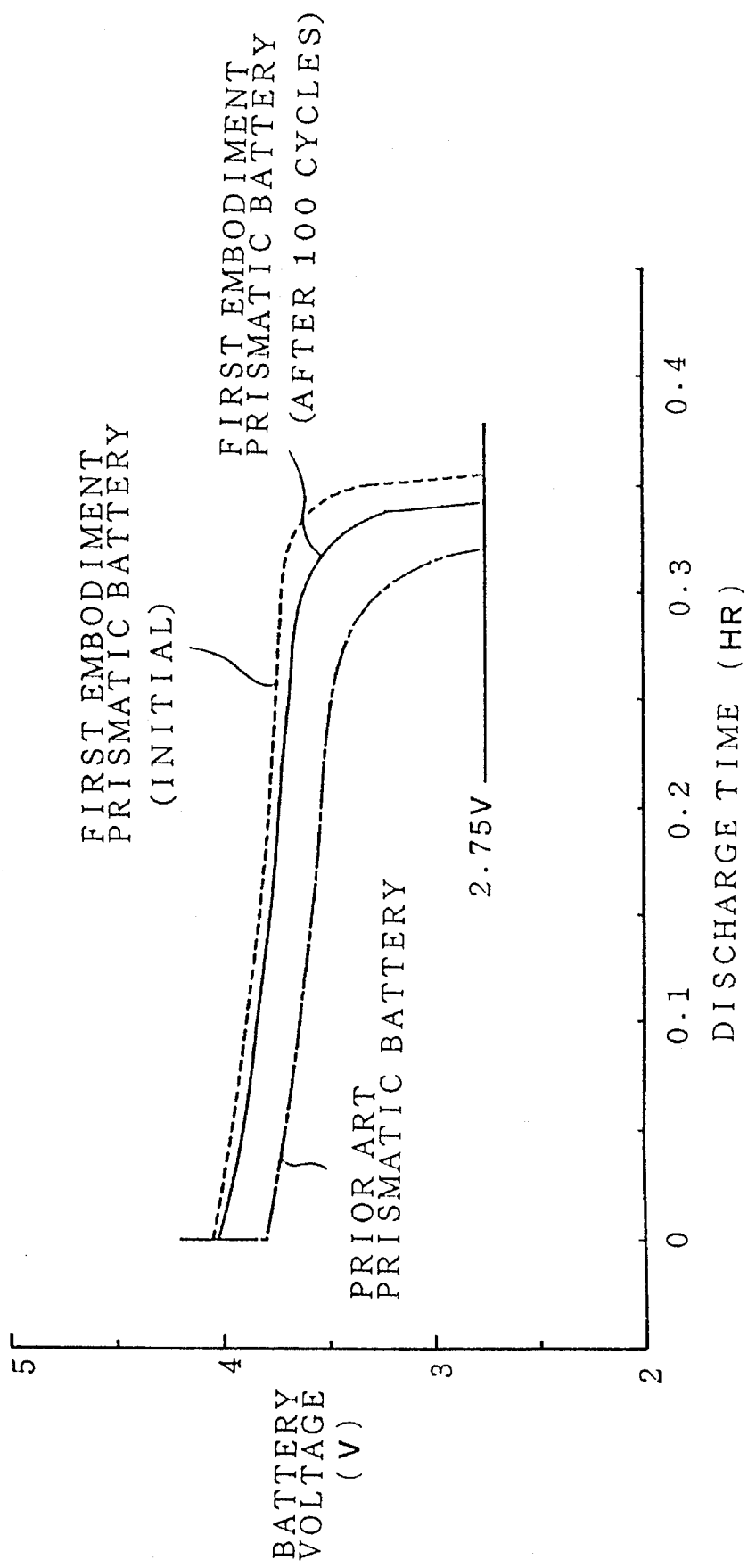

TIGHTLY SEALED PRISMATIC BATTERY

BACKGROUND OF THE INVENTION

This invention relates to a tightly sealed prismatic battery in which a non-circular spiral electrode unit is housed within a prismatic shaped can.

Increasing demand for portable office automation equipment and communication devices has resulted in an increasing requirement for nickel-cadmium and lithium ion rechargeable batteries as power sources, and in particular, for prismatic shaped batteries that can be efficiently mounted. In addition, since batteries are used as power sources for portable devices, it goes without saying that large battery capacity per unit volume is important. In other words, the advance of light-weight portability in recent years has brought about serious regard for high energy density characteristics.

Changing the can material from iron or stainless steel to lighter aluminum or reducing the can thickness are effective ways to make a battery light-weight. This is because the weight of the can is a large fraction of a battery's gross weight. However, when the can material is changed to aluminum or the can thickness is reduced, the strength of the can drops significantly. For example, since the longitudinal module of elasticity of aluminum is one third that of iron, the bending strength of an aluminum can is only one third that of an iron can with the same dimensions.

When can strength is reduced and the battery's internal pressure increases, can deformation can result. Internal pressure increases when gas is produced inside a tightly sealed battery. Abnormal battery conditions such as a short circuit, excessive current flow, or over-charging can result in gas production. A can with insufficient strength has the drawback that it can deform due to a rise in internal pressure. Can deformation can cause various problems. For example, large can deformation can result in breaking open the battery and damaging the electrical device in which it is installed. In a tightly sealed battery which depends on electrical contact between the outer winding of an electrode unit and the can which confines it, can deformation can increase contact resistance by separating the can from the electrode resulting in increased internal battery resistance.

The technology for a novel battery can reinforcing structure is described by Japanese Non-examined Patent Publication No. 62-93854 issued April 30,1987. The tightly sealed battery described in this disclosure is reinforced by providing a region of thicker material on the battery can.

This thicker material can reinforce the can and reduce deformation. However, thicker material on the battery can increases the external dimensions of the battery in opposition to the objective of miniaturization. The present invention was developed to further solve these problems. It is thus a primary object of the present invention to provide a tightly sealed shaped battery that can effectively prevent deformation of the can without increasing its dimensions.

The above and further objects and features of the invention will more fully be apparent from the following detailed description with accompanying drawings.

SUMMARY OF THE INVENTION

The tightly sealed prismatic battery of this invention comprises a non-circular spiral electrode unit enclosed within a prismatic can. Further, the can of this tightly sealed prismatic battery is thicker in its corner regions than in straight line regions. When a non-circular (and non-prismatic) spiral electrode unit is housed within a prismatic can, vacancies occur at corner regions inside the can. The reason for this is because the electrode unit is spiral shaped and the can is prismatic shaped. The tightly sealed prismatic battery of this invention effectively uses these corner vacancies to reinforce the prismatic can.

If R is the radius of curvature of the inner surface of the corner region of the prismatic can, r is the radius of curvature of the outer surface of the corner region of the can, and d is the thickness of the can in the straight line regions, then it is preferable that R, r, and d of the tightly sealed prismatic battery of this invention satisfy the following equation.

$$R > r - d$$

Further, to make the can light-weight, the tightly sealed prismatic battery of this invention employs aluminum or an aluminum alloy as the prismatic can material.

The tightly sealed prismatic battery of this invention does not increase prismatic can strength by enlarging the external dimensions of the can, but rather fully utilizes vacancies established inside corners due to the insertion of a spiral shaped electrode unit into a prismatic can. A prior art prismatic battery, with can thickness at corners equal to that of straight line segments, has the cross-sectional structure shown in FIG. 1. Turning to FIG. 1, the prismatic battery shown has a non-circular spiral electrode unit 12 housed within a prismatic shaped can 11. There are corner vacancies 13 between corners of the can 11 and the non-circular spiral electrode unit 12. On the other hand, the prismatic can of the present invention, with greater thickness at the corner regions than at straight line regions, has the cross-sectional structure shown in FIG. 2.

It has been shown that the bending strength of a prismatic can decreases in proportion to the cube of the length of its long side. As the length of the long side increases, the straight line region is more easily deformed by internal pressure. The effective length of the long side of the can of the prismatic battery of the present invention is shortened by increasing the can thickness in the corner regions. This results in considerable bending strength increase.

If, for example, the can of the prior art prismatic battery shown in FIG. 1 and the can of the prismatic battery of the present invention shown in FIG. 2 have the dimensions given below, the bending strength of the can of the present invention is approximately 50% greater than that of the prior art can with the same external dimensions.

(1) Can dimensions for the prior art prismatic battery shown in FIG. 1 are as follows.

length and width of the can 22 mm×7.6 mm thickness d of a straight line region of the can 0.5 mm radius of curvature r of can outer wall at a corner 1.7 mm radius of curvature R of can inner wall at a corner 1.2 mm length of the long side of the prismatic can 18.6 mm (The length of the long side is calculated by the following formula.)

long side length=[22−(2×0.5)−(2×1.2)]mm;

(2) Can dimensions for the first embodiment of the prismatic battery of the present invention shown in FIG. 2 are as follows.

length and width of the can same as prior art can of FIG. 1 thickness d of a straight line region of the can same as prior art can of FIG. 1 radius of curvature r of can outer wall at a corner 1.7 mm radius of curvature R of can inner wall at a corner 2.3 mm length of the long side of the prismatic can 16.4 mm (The length of the long side is calculated by the following formula.)

long side length=[22−(2×0.5)−(2×2.3)]mm

Since can bending strength is directly proportional to the cube of the length of the long side, the bending strength of the prismatic battery can of the present invention is $(18.6/16.4)^3=1.46$ times that of the prior art can, or approximately 50% greater than that of the prior art can.

Turning to FIG. 3, the amount of can swelling is shown as a function of internal pressure. In this figure, the amount of can swelling is plotted with ○ for the prismatic battery of the present invention shown in FIG. 2 and with ● for the prior art prismatic battery shown in FIG. 1. For example, as shown in FIG. 3, when internal pressure is 5 $Kg/cm^2$, swelling of the prismatic can of the present invention is 0.64 mm while swelling of the prior art prismatic can is 0.96 mm. In other words, swelling of the prior art can is approximately 50% greater than swelling of the can of the present invention. This is in good agreement with the previously calculated value.

As described above, the prismatic battery of this invention reinforces the can by making it thicker in corner regions than in straight line regions. Wasted space resulting from the insertion of a non-circular spiral electrode unit into a prismatic can is effectively used to reinforce the can. For this reason, the prismatic can is effectively reinforced without increasing its external dimensions. Further, since the vacancies resulting from insertion of a spiral electrode unit in a prismatic can are effectively used to reinforce the can, there is no reduction in the capacity of the prismatic battery itself. Consequently, with the tightly sealed prismatic battery of the present invention, external dimensions can be designed the same while prismatic can strength is improved to prevent degradation of battery characteristics due to can swelling. As a result, the can can be designed thinner or iron and stainless steel can material can be replaced by aluminum and still provide sufficient strength.

In this manner, bending strength of the external case of the tightly sealed prismatic battery of the present invention is made sufficiently strong without reducing battery capacity. Further, since can bending strength is increased, interelectrode pressure of the spiral electrode unit is stabilized to improve battery capacity, energy density, and high-rate discharge characteristics.

BRIEF DESCRIPTION OF THE DRAWINGS

FIG. 5 is a graph showing voltage characteristics during high-rate discharge at 3 C for an embodiment of the prismatic battery of the present invention and a prior art prismatic battery after 100 charge-discharge cycles, and initial voltage characteristics for the battery of the present invention.

DETAILED DESCRIPTION OF THE INVENTION

Figure 2:
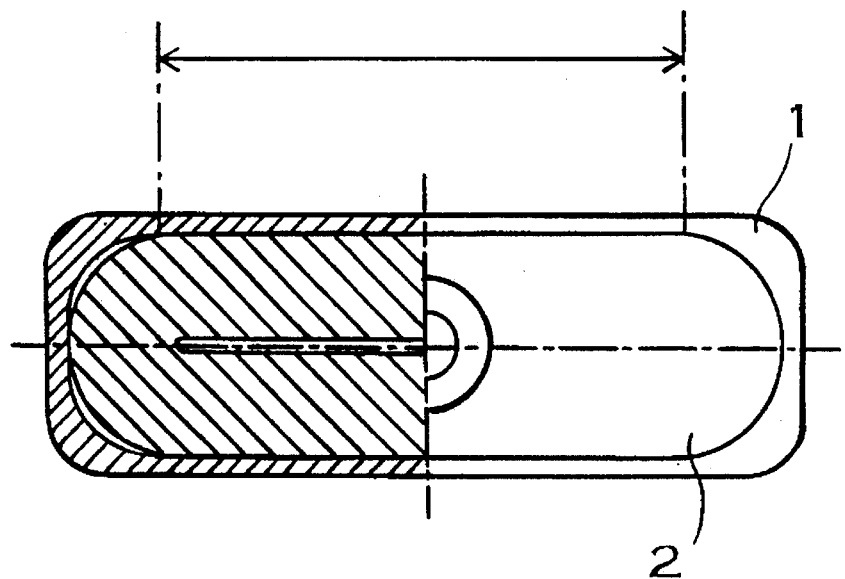
FIG. 2 is a partial cross section view showing the structure of the prismatic battery of the present invention.
Figure 3:
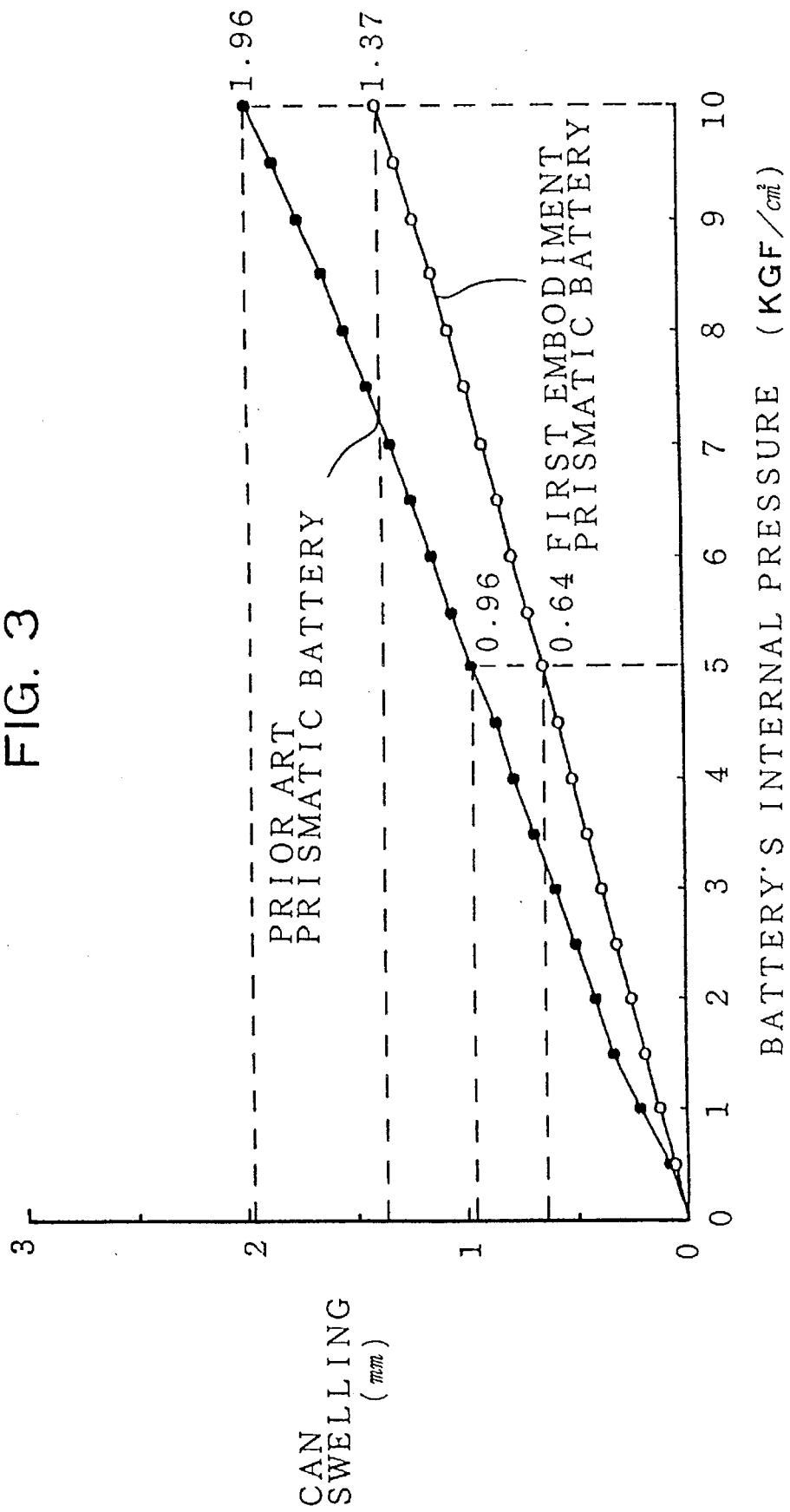
FIG. 3 is a graph showing the amount of can swelling for prismatic shaped batteries as a function of internal pressure.
Figure 4:
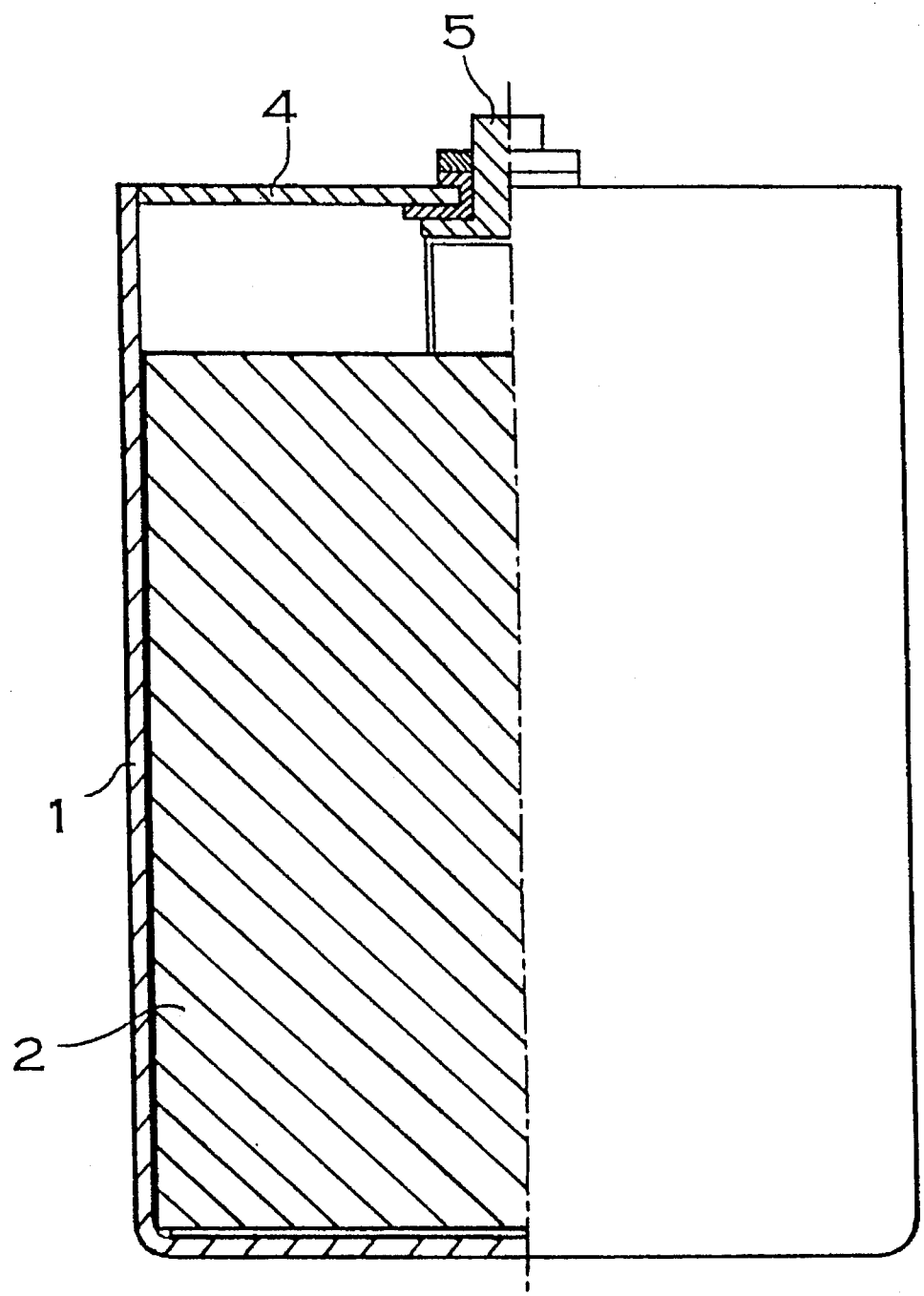
FIG. 4 is a partial cross section front view of the prismatic battery of the present invention showing the can layout.

Turning to FIGS. 2 and 4, the tightly sealed prismatic battery shown has a non-circular spiral electrode unit 2 housed within a prismatic shaped can 1. The non-circular spiral electrode unit 2 is formed with a separator sandwich between positive and negative electrode plates and rolled into a non-circular spiral shape. The non-circular spiral electrode unit 2 is inserted into the prismatic shaped can 1 such that electrical contact is established between the outermost winding of the electrode unit and the inner wall of the prismatic shaped can 1. In other words, as shown in FIGS. 2 and 4, the structure of the prismatic battery is such that the outermost winding of the non-circular spiral electrode unit 2 is in contact with the prismatic shaped can 1 within which it is housed. The outermost winding of the non-circular spiral electrode unit 2 is normally the positive electrode. Consequently, the can becomes the positive electrode. The negative electrode plate of the non-circular spiral electrode unit 2 is connected via an electrode lead to a fixed negative electrode 5 insulated from the can. An insulating cap 4 forms an air-tight seal closing off the open end of the can. A safety valve can also be installed at the negative electrode of the insulating cap.

The material of the prismatic can 1 is made of aluminum. However, prismatic can 1 material is not limited to aluminum, and clearly iron or stainless steel may also be used. Since a prismatic can 1 made of iron or stainless steel is stronger than that made of aluminum, the can can be designed thinner.

FIRST EMBODIMENT

The aluminum prismatic can 1 is designed with the following dimensions.

(1) length and width of the can 22 mm×7.6 mm (2) thickness of a straight line region of the can 0.5 mm (3) radius of curvature of can outer wall at a corner 1.7 mm (4) radius of curvature of can inner wall at a corner 2.3 mm (5) maximum can thickness at a corner 0.96 mm (6) length of the long side of the prismatic can 16.4 mm

SECOND EMBODIMENT

The aluminum prismatic can 1 is designed with the following dimensions.

(1) length and width of the can 22 mm×7.6 mm (2) thickness of a straight line region of the can 0.5 mm (3) radius of curvature of can outer wall at a corner 1.7 mm (4) radius of curvature of can inner wall at a corner 3.0 mm (5) maximum can thickness at a corner 1.25 mm (6) length of the long side of the prismatic can 15.0 mm (The length of the long side is calculated by the following formula.)

long side length=[22−(2×0.5)−(2×3.0)]mm.

Figure 1:
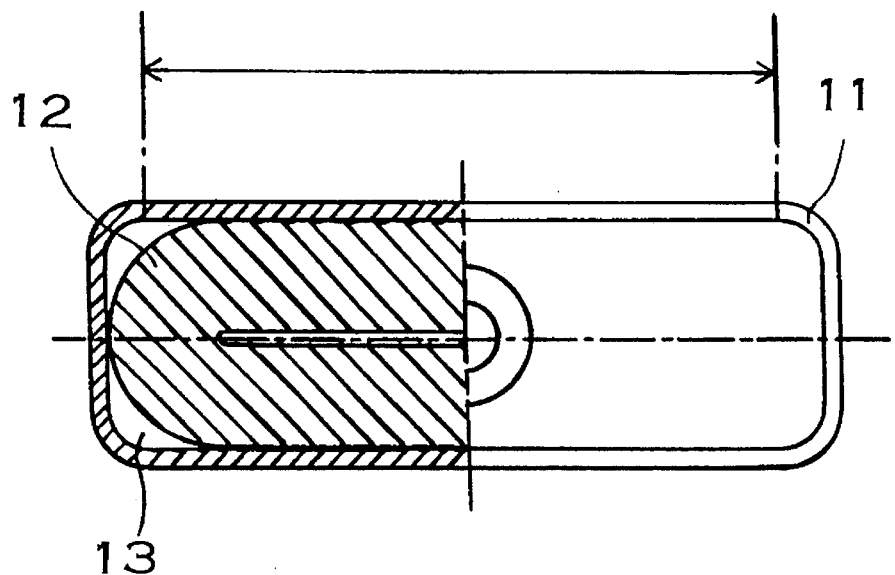
FIG. 1 is a partial cross section view showing the structure of a prior art prismatic battery.

Prismatic batteries using the dimensions of the prismatic can 1 of the first embodiment as well as a prior art prismatic battery using the can 11 of FIG. 1 and having the dimensions described therefore were cycled through charge and discharge 100 times. In each cycle batteries were charged to 4.2 V with 1 C and discharged to 2.75 V at 1 C. FIG. 5 shows battery voltage characteristics during high-rate discharge at 3 C after 100 charge-discharge cycles for the first embodiment and the prior art battery as well as initial voltage characteristics prior to cycling for the first embodiment. As shown in this figure, average voltage as well as battery capacity of the prior art prismatic battery is reduced compared to the present invention. This is due to increased internal pressure from 100 charge-discharge cycles producing swelling of the can and increased internal resistance. On the other hand, prismatic can swelling is reduced for embodiments of the present invention, and higher voltage is obtained since internal resistance does not increase. The present invention has excellent voltage as well as battery capacity characteristics.

Still further, for comparison with prior art batteries, swelling of prismatic batteries of the present invention was measured after 100 charge-discharge cycles and the following exceptional characteristics were shown.

(1) can swelling of the first prismatic battery embodiment 0.32 mm (2) can swelling of the second prismatic battery embodiment 0.22 mm (3) can swelling of the prior art battery of FIG. 1 0.49 mm For clarity, numerical values for prismatic cans of the first and second embodiments and first comparison example are compared in the following table. Here, R, r, and d of this table present the following numerical values.

R . . . radius of curvature of can inner wall at a corner
r . . . radius of curvature of can outer wall at a corner
d . . . thickness of a straight line region of the can

TABLE 1

|  | R (mm) | r (mm) | d (mm) | MAXIMUM CASING THICKNESS AT A CORNER (mm) | SWELLING AFTER 100 CYCLES (mm) |
| --- | --- | --- | --- | --- | --- |
| EMBODIMENT 1 | 2.3 | 1.7 | 0.5 | 0.96 | 0.32 |
| EMBODIMENT 2 | 3.0 | 1.7 | 0.5 | 1.25 | 0.22 |
| COMPARISON 1 | 1.2 | 1.7 | 0.5 | 0.50 | 0.49 |

Further, with the exception that the radius of curvature of the can inner wall at a corner R is changed from 1.2 mm to 0.8 mm and maximum can thickness at a corner is changed from 0.50 mm to 0.33 mm, swelling after 100 charge-discharge cycles of an can manufactured in the same manner as the first comparison example is shown in the following Table 2.

TABLE 2

|  | R (mm) | r (mm) | d (mm) | MAXIMUM CASING THICKNESS AT A CORNER (mm) | SWELLING AFTER 100 CYCLES (mm) |
| --- | --- | --- | --- | --- | --- |
| COMPARISON 2 | 0.8 | 1.7 | 0.5 | 0.33 | 0.56 |

As this invention may be embodied in several forms without departing from the spirit of essential characteristics thereof, the present embodiments are therefore illustrative and not restrictive, since the scope of the invention is defined by the appended claims rather than by the description proceeding them, and all changes that fall within the meets and bounds thereof are therefore intended to be embraced by the claims.

What is claimed is:

1. A sealed prismatic battery comprising:
   a non-circular spiral electrode unit which is a laminate of a positive electrode plate, a negative electrode plate, and a separator between the two electrode plates, said laminate being wound into a non-circular spiral shape; and
   a prismatic shaped can formed in a prismatic box shape and having corner regions and straight-line regions, said non-circular spiral electrode unit being enclosed in said prismatic shaped can; and
   wherein said corner regions of said prismatic shaped can are greater in thickness than said straight-line regions of said prismatic shaped can.

2. A sealed prismatic battery as recited in claim 1, wherein dimensions of said prismatic shaped can satisfy the following relation:

$$R > r - d,$$

wherein R is a radius of curvature of an inner wall of each of said corner regions, r is a radius of curvature of an outer wall of each of said corner regions, and d is a thickness of said straight-line regions.

3. A sealed prismatic battery as recited in claim 1, wherein said can is formed of aluminum.

4. A sealed prismatic battery as recited in claim 1, wherein said can is formed of an alloy of aluminum.

5. A sealed prismatic battery as recited in claim 1, wherein said can is formed of a ferrous material.

6. A sealed prismatic battery as recited in claim 1, wherein said can is formed of a stainless steel.

7. A sealed prismatic battery as recited in claim 1, wherein an outermost winding of said non-circular spiral electrode unit is in electrical contact with an inner wall of said prismatic shaped can.

* * * * *